United States Patent
Echeverri et al.

(10) Patent No.: US 8,686,954 B2
(45) Date of Patent: Apr. 1, 2014

(54) TOUCH-SENSITIVE DISPLAY AND METHOD OF CONTROLLING SAME

(75) Inventors: Oscar Echeverri, Nepean (CA); John Jong-Suk Lee, Waterloo (CA); Alen Mujkic, Mississauga (CA)

(73) Assignee: Blackberry Limited, Waterloo (CA)

( * ) Notice: Subject to any disclaimer, the term of this patent is extended or adjusted under 35 U.S.C. 154(b) by 443 days.

(21) Appl. No.: 12/578,908

(22) Filed: Oct. 14, 2009

(65) Prior Publication Data

US 2010/0214237 A1 Aug. 26, 2010

Related U.S. Application Data

(60) Provisional application No. 61/154,496, filed on Feb. 23, 2009.

(51) Int. Cl.
*G06F 3/041* (2006.01)
(52) U.S. Cl.
USPC .......................................................... 345/173
(58) Field of Classification Search
USPC .......................................................... 345/173
See application file for complete search history.

(56) References Cited

U.S. PATENT DOCUMENTS

| 2008/0082934 A1 | 4/2008 | Kocienda et al. | |
| 2008/0320391 A1* | 12/2008 | Lemay et al. | 715/702 |

FOREIGN PATENT DOCUMENTS

| KR | 10-2002-0038177 A | 5/2002 |
| KR | 10-0867096 B1 | 8/2007 |
| WO | 2008030972 A1 | 3/2008 |
| WO | 2008082934 A1 | 3/2008 |
| WO | WO 2008030972 A1 * | 3/2008 |
| WO | 2008086302 A1 | 7/2008 |

OTHER PUBLICATIONS

International Search Report for International Patent Application No. PCT/CA2009/001461, dated Jan. 14, 2010, 25 pages.
Written Opinion for International Patent Application No. PCT/CA2009/001461, dated Jan. 14, 2010, 7 pages.
"Mouse Gesture", Wikipedia, http://en.wikipedia.org/wiki/Opera_(web_browser), 3 pages.
"Opera (web browser)", Wikipedia, http://en.wikipedia.org/wiki/Mouse_gesture, 13 pages.
Office Action in corresponding Canadian application 2,751,480, issued Mar. 18, 2013, 6 pages.
Office Action in corresponding Korean application 10-2011-7022214, issued Apr. 26, 2013, 9 pages including English translation.
Office Action in corresponding Chinese application 200980157338. 5, issued Jul. 24, 2013, 21 pages.

* cited by examiner

*Primary Examiner* — Abbas Abdulselam
*Assistant Examiner* — Shawna Stepp Jones
(74) *Attorney, Agent, or Firm* — Geoffrey deKleine; Borden Ladner Gervais LLP

(57) ABSTRACT

Information including a first part of a list is displayed on a touch-sensitive display (118) of a portable electronic device (100). The touch-sensitive display (118) detects (403) a first gesture in a first direction on the touch-sensitive display and scrolls (409, 411) within the information in response to the first gesture. The touch-sensitive display (118) detects (403) a second gesture in a second direction on the touch-sensitive display and displays a second part of (415, 417) the list on the touch-sensitive display in response to the second gesture.

31 Claims, 7 Drawing Sheets

TOUCH-SENSITIVE DISPLAY AND METHOD OF CONTROLLING SAME

CROSS REFERENCE TO RELATED APPLICATIONS

The present application claims the benefit of priority of U.S. Provisional Patent Application No. 61/154,496, filed Feb. 23, 2009, the entirety of which application is incorporated herein by reference.

FIELD OF TECHNOLOGY

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities. These devices run on a wide variety of networks from data-only networks such as Mobitex® and DataTAC® networks to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch screen display for input and output is particularly useful on such handheld devices, as such handheld devices are small and are therefore limited in space available for user input and output devices. These devices have a limited area for rendering content on the touch screen display and for rendering features or icons, for example, for user interaction. With continued demand for decreased size of portable electronic devices, touch screen displays continue to decrease in size.

Improvements in touch screen devices are therefore desirable.

DETAILED DESCRIPTION

Figure 1:
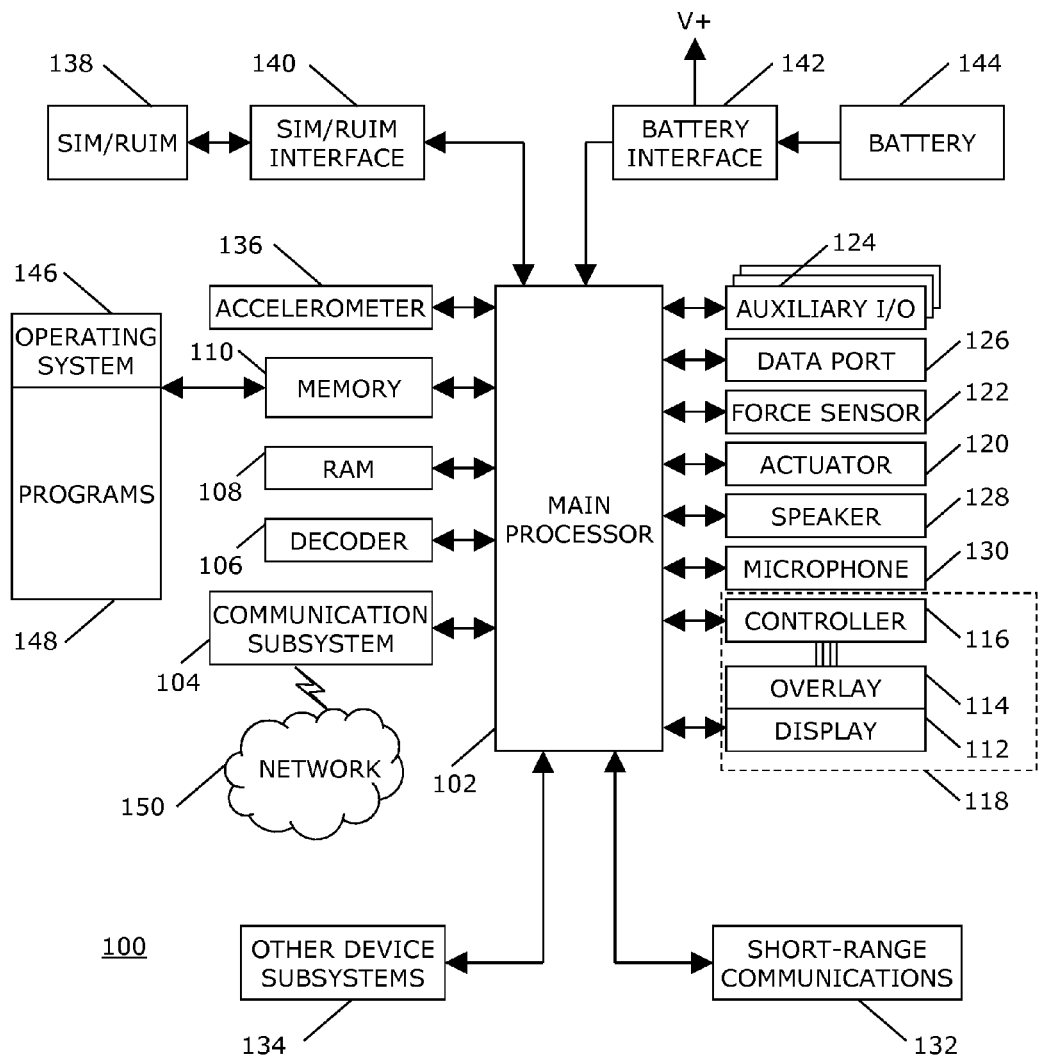
FIG. 1 is a block diagram of a portable electronic device in accordance with the present disclosure.

The following describes an apparatus for and method of displaying information in the form of a list or other format on a touch-sensitive display of a portable electronic device. The touch-sensitive display detects a first gesture, such as a swipe, in a first direction on the touch-sensitive display and scrolls within the information in response to the first gesture. The touch-sensitive display detects a second gesture, such as a swipe, different than the first gesture, for example, in a second direction or comprising another gesture such as a double swipe, on the touch-sensitive display and displays a second part of information, for example, a second part of the list, on the touch-sensitive display in response to the second swipe. The first direction differs from the second direction, for example, one may be horizontal and the other vertical. The term "list" herein refers to a large amount of information, including, but not limited to, a series of words, characters, data, and so forth.

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of an embodiment of a portable electronic device 100 is shown in FIG. 1. The portable electronic device 100 includes a number of components such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a memory 110, a display 112 with a touch-sensitive overlay 114 connected to an electronic controller 116 that together make up a touch-sensitive display 118, an actuator 120, a force sensor 122, an auxiliary input/output (I/O) subsystem 124, a data port 126, a speaker 128, a microphone 130, short-range communications 132 and other device subsystems 134. The processor 102 interacts with the touch-sensitive overlay 118 via the electronic controller 116. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the memory 110.

The portable electronic device 100 also includes an operating system 146 and software components 148 that are executed by the processor 102 and are typically stored in a persistent, updatable store such as the memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is substantially similar except that the received signals are output to the speaker 128 and signals for transmission are generated by the microphone 130.

The touch-sensitive display 118 is configured to display information from an application, such as a web browser, contact list, email, voicemail, calendar, music player, spreadsheet, word processing, operating system interface, and so forth, and receive a swipe by a user of the portable electronic device 100. The information may be data, pictures, webpages, application output, text, characters, symbols, images, and other items that may be displayed on a portable electronic device. A gesture, also known as an interaction or input, may comprise, for example, a swipe, also known as a flick, is generally defined for the purposes of this disclosure as a particular type of touch on a touch-sensitive display 118 that begins at an origin point and continues contact to an end point. A gesture may be long or short in distance and/or duration. A gesture may comprise, for example, a single swipe, comprising one origin point and one end point, a double swipe, comprising two origin points and two end points, other multiple swipes, or may comprise multiple touch aspects, such as one or more swipes in combination with a touch, or other suitable touch events. Although the description herein utilizes examples including swipes and combinations of swipes and touches, other suitable gestures may be utilized. Two points of the gesture, such as a swipe, are utilized to determine a vector that describes a direction of the gesture, eg., the swipe. The direction may be references with respect to the touch-sensitive display 118, the orientation of the information displayed on the touch-sensitive display 118, or another reference. For the purposes of providing a reference, "horizontal" as utilized herein comprises a direction substantially parallel to a left-to-right or right-to-left scan, and "vertical" as utilized herein comprises a direction substantially parallel to an top-to-bottom or bottom-to-top scan. In the example where the gesture is a swipe, the endpoints of the swipe are utilized to determine the magnitude or distance of the swipe. The duration of the gesture, e.g., a swipe, is determined from the endpoints of the gesture, e.g., swipe, in time. The controller 116 and/or the processor 102 determine the direction, magnitude, and/or duration of the gesture, e.g., a swipe.

When a gesture, such as a swipe, is detected in a first direction, e.g., vertical, scrolling within the information occurs. This gesture in a first direction may be the default or normal gesture, such as a swipe. When a gesture, such as a swipe, is detected that is different from the first gesture, e.g., the gesture is a double swipe or takes place in a second direction, e.g., horizontal, the part of the information or list displayed on the touch-sensitive display 118 changes. Because a touch-sensitive display 118 on a portable electronic device 100 is typically relatively small, the amount of information displayed from an application is typically much less than the amount of information that may be displayed, for example, on a computer monitor or other larger device. A predetermined amount of information from an application, based on the screen size and memory capability of the device controlling the display of information on the screen, is available to be displayed using scrolling techniques. This predetermined amount of information is often more than fits on a screen or window to avoid needlessly having to download more information, which takes time.

The information may therefore be comprised of multiple parts, referred to herein, in some examples, as parts of a list. These parts may be, for example, search results presented to a user (such as lists of people, things, auction items, products for sale, specifications, and so forth), emails, contacts, calendar events, spreadsheets, text, data from a database, songs, and pictures, to name a few. For example, an auction page accessed by a web browser may permit display of 25 items at a time. The user's search may have identified 500 items, thus requiring 20 downloads to display all the items. Typically, a button on the webpage is selected to advance to the next page of results or part of the list, and another button is selected to go back to the previous page or part of the list. Other applications have similar advancing or decrementing mechanisms, such as entering a menu and making a selection. The use of a gesture, such as a swipe, instead of selection of a button or use of a menu facilitates list advance and decrement without having to scroll along the available information to find and select a button to advance or decrement the list, and thus may be performed no matter what part of a page is displayed at the time of the gesture. Further, the need to find and press a button on a specific part of a webpage or entering a menu is prevented, thereby speeding up the process of navigating a list to see more content.

Figure 2:
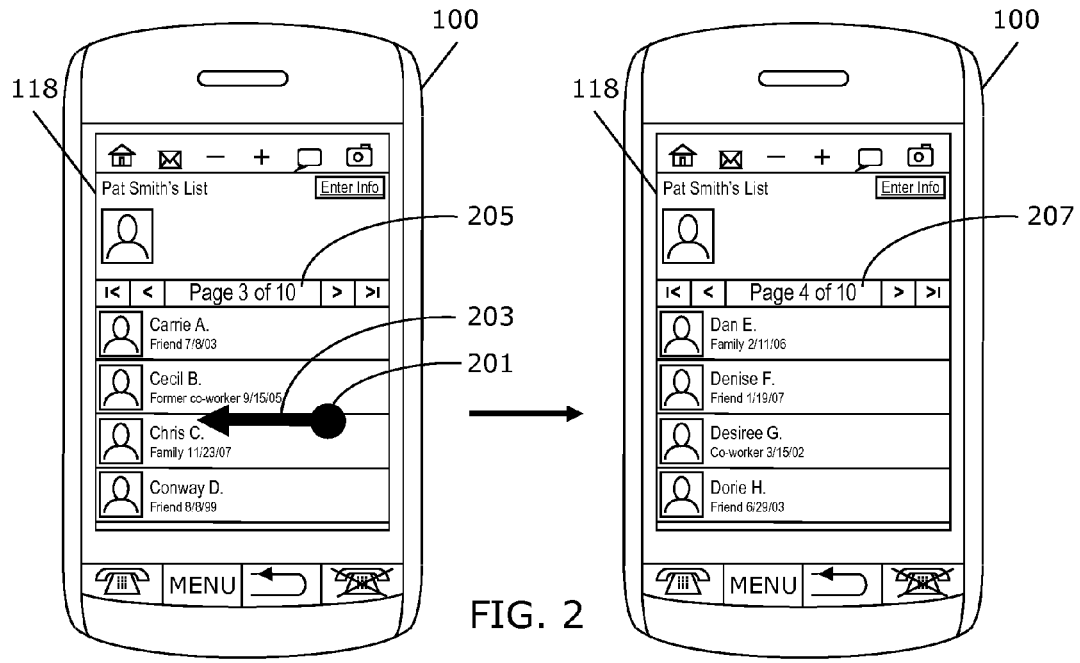
FIG. 2 and FIG. 4 illustrate examples of a display before and after advancing information in the form of a list in a webpage in accordance with the present disclosure.
Figure 3:
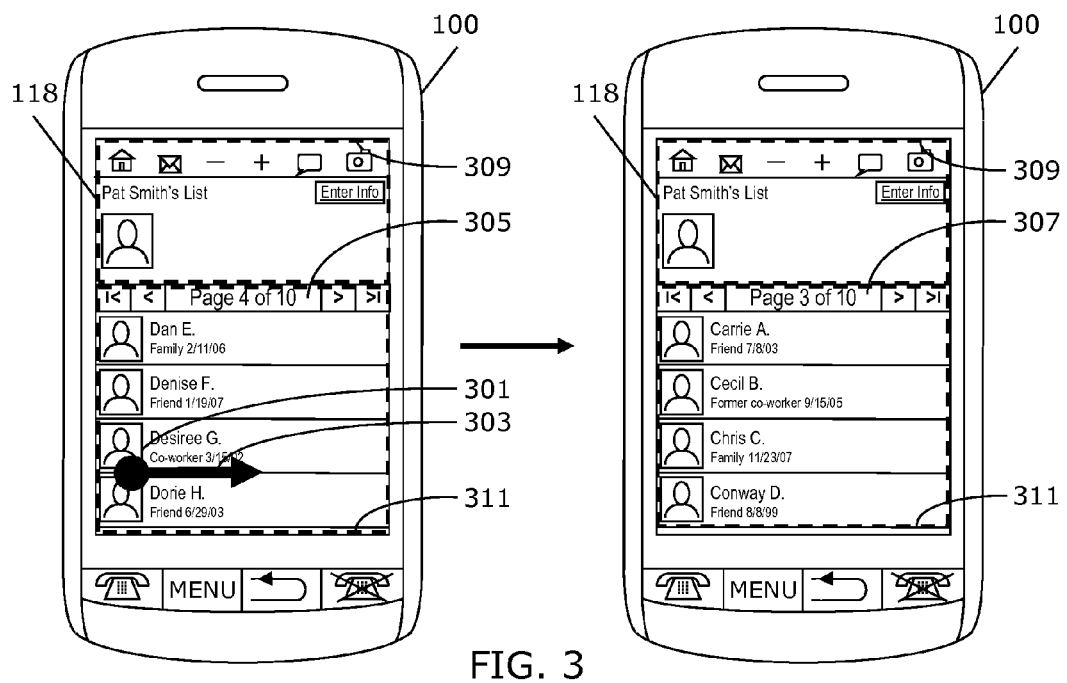
FIG. 3 and FIG. 5 illustrate examples of a display before and after decrementing information in the form of a list in a webpage in accordance with the present disclosure.

An example of a display before and after advancing or incrementing a list in a webpage is shown in FIG. 2, and an example of a display before and after decrementing a list in a webpage is shown in FIG. 3. In this example, contacts from a social-networking website are presented to a user. The left-hand device 100 of FIG. 2 shows a window 205 that indicates Page 3 of 10 of the list of contacts. The origin point 201 of the gesture, in the form of a swipe, 203 is shown on the right side of the touch-sensitive display 118, and the direction of the swipe is from right to left on the screen 118. When this swipe is detected, the touch-sensitive display 118 advances the page displayed, and as shown in the right-hand device 100 of FIG. 2, Page 4 of 10 is indicated in the window 207.

Similarly, the page may be decremented as shown in FIG. 3. The left-hand device 100 of FIG. 3 shows a window 305 that indicates Page 4 of 10 of the list of contacts. The origin point 301 of the gesture, in the form of a swipe, 303 is shown on the left side of the touch-sensitive display 118, and the direction of the gesture is from left to right on the screen 118. When this swipe is detected, the touch-sensitive display 118 decrements the page displayed, and as shown in the right-hand device 100 of FIG. 3, Page 3 of 10 is indicated in the window 307. In these examples, the swipe takes place in one of two horizontal directions, and which horizontal direction determines whether a part of the list that occurs earlier or later is displayed.

Optionally, a first part 309 of the display 118 may display common or the same information related to the application no matter which part of the information, e.g., a list, is displayed, and a second part 311 of the display 118 may display the various parts of the information, e.g., the list. In other words, the part of the list being displayed changes in the second part of the display 311 while the contents of the rest of the screen 118 are preserved in the first part 309. The first part 309 may be contiguous or non-contiguous, i.e., in separate parts. The first part 309 and second part 311 may be oriented, for example, as shown in FIG. 3 with the first part 309 above the second part 311, or the first part 309 may be below the second part. The parts 309, 311 may be side-by-side. The parts may take on different shapes, for example, where the second part 311 is displayed in one corner and the first part 309 forms an L-shape or inverted L-shape.

Figure 4:
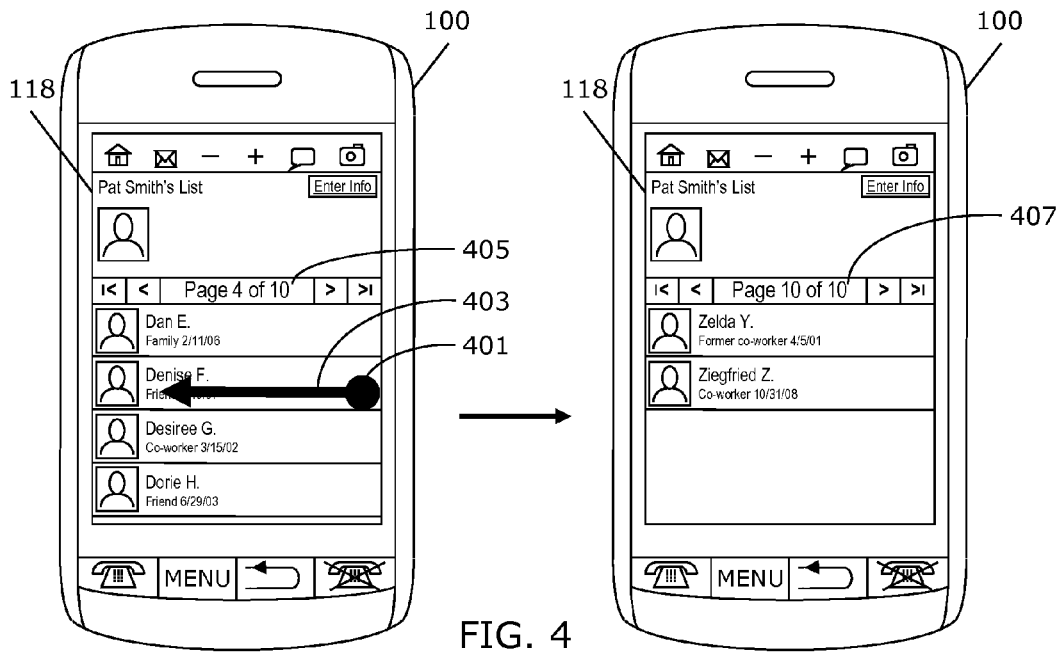
Figure 5:
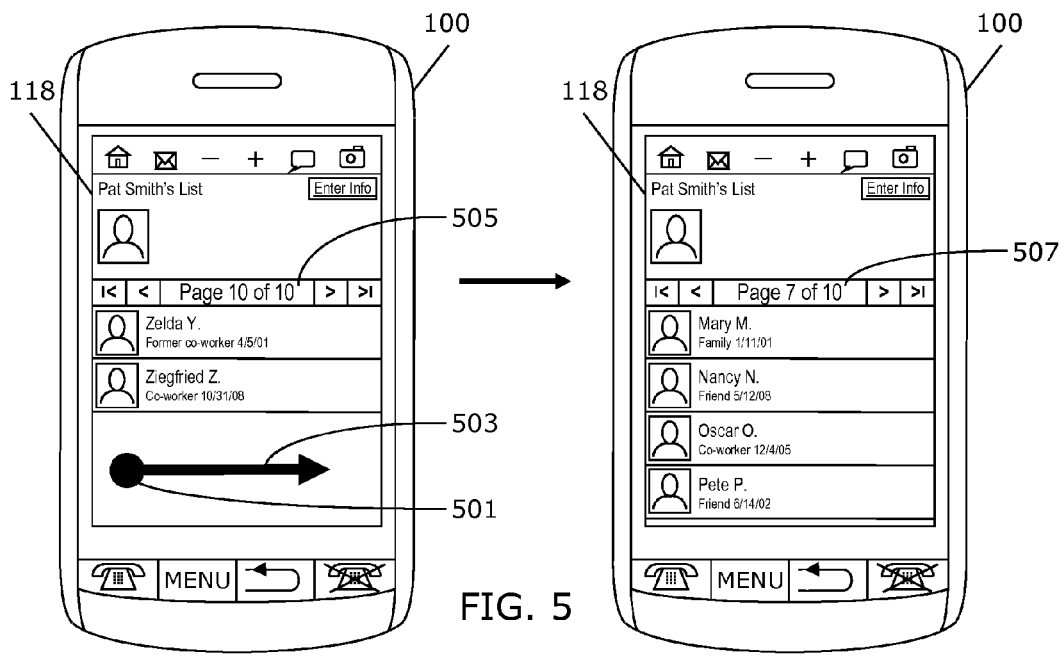

Optionally, the length of the gesture, either by distance or time duration, may be utilized to determine what part of the list to display or to determine how far to increment or decrement the list. Two, three, or more levels of distinction may be utilized. For example, a two-level system divides gestures, e.g., swipes, into short swipes and long swipes, wherein one or more thresholds are utilized to determine whether a swipe is considered long or short. A short swipe increments or decrements the list by one part or page in the list, such as shown in FIG. 2 and FIG. 3. A long swipe increments or decrements the list by more than one part or page in the list, such as shown in FIG. 4 and FIG. 5.

A long gesture, such as a swipe, may be utilized to jump to the beginning or end of a list. In the example shown in FIG. 4, the origin point 401 of the swipe 403 is shown on the right side of the touch-sensitive display 118, and the direction of the swipe is from right to left on the screen 118. When this long swipe 403 is detected, and in this example, the long swipe 403 is interpreted as displaying one end of the list, the touch-sensitive display 118 advances the page displayed to the last page, and as shown in the right-hand device 100 of FIG. 4, Page 10 of 10, is indicated in the window 407.

A long gesture, such as a long swipe, may also be interpreted as incrementing or decrementing by multiple parts or pages of the information, for example, a list. The number of multiples may vary. For example, a fixed number may be chosen, such as 2, 3, 4, and so forth, and the list increments or decrements by 2, 3, 4, and so forth pages respectively. Alternatively, the number of multiples may vary based on the number of parts or pages in the list as a whole, e.g., total pages divided by 2, 3, and so forth, or based on the number of parts or pages to be displayed in the direction of the gesture, i.e., total pages less the current page if incrementing or current page minus 1. For example, if the third page is displayed out of nine total pages, a multiple could be one-half or one-third of the way to the end, i.e., a 3-page increment/decrement or a 2-page increment/decrement, respectively. In the example shown in FIG. 5, the origin point 501 of the swipe 503 is shown on the left side of the touch-sensitive display 118, and the direction of the swipe 503 is from left to right on the screen 118. The left-hand device 100 of FIG. 5 shows a window 505 that indicates Page 10 of 10 of the list of contacts. When this long swipe 503 is detected, and in this example, the long swipe 503 is interpreted as incrementing/decrementing by 3 parts or pages, the touch-sensitive display 118 decrements the page displayed by 3 pages, and as shown in the right-hand device 100 of FIG. 5, Page 7 of 10 is indicated in the window 507.

A three-level system divides gestures, e.g., swipes into short swipes, medium swipes, and long swipes, wherein two or more thresholds are utilized to determine whether a swipe is considered short, medium, or long. For example, short swipe may be interpreted as incrementing/decrementing by 1 part or page, a medium swipe may be interpreted as incrementing/decrementing by a multiple parts or pages (such as described in the previous paragraph), and a long swipe may be interpreted as displaying the first or last page of the list. The thresholds for determining the length may be based strictly on length. Alternatively, the long swipe may be interpreted as one that begins on the screen and continues off the edge of the screen 118, whereas the short and medium swipes are determined by a threshold and these swipes both originate and end on the screen 118.

Figure 6:
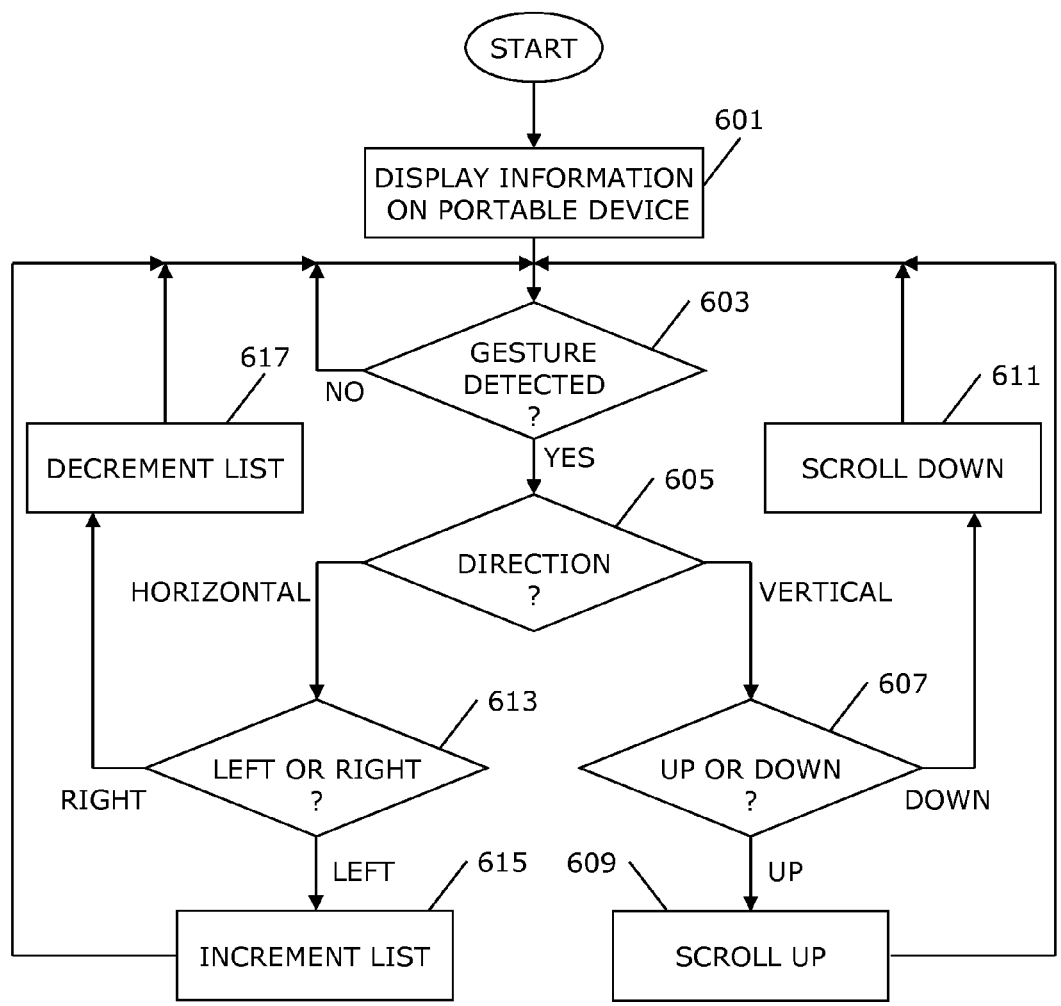
FIG. 6 is a flowchart illustrating a method of displaying a webpage based on a detected gesture in accordance with the present disclosure.

FIG. 6 is a flowchart illustrating a method of displaying information based on a detected gesture. The flowchart is advantageously performed by the microprocessor 102 performing stored instructions from a computer-readable medium, such as described above. Coding of software for carrying out such a method is within the scope of a person of ordinary skill in the art given the present description. Information is displayed 601 on the touch-sensitive display 118 of the portable electronic device 100. In the example shown, a multiple-part list is navigated through by a web browser, and a swipe is utilized as the example of a gesture for the purpose of describing the method. When a gesture, e.g., a swipe, is detected 603, a direction for the swipe is determined 605 as described above. If the swipe takes place in a substantially vertical direction, a determination of the vertical direction is made 607. When the vertical direction indicates to scroll up, the display 118 scrolls 609 upward within the webpage. When the vertical direction indicates to scroll down, the display 118 scrolls 611 downward within the webpage. If the swipe takes place in a substantially horizontal direction, a determination of the horizontal direction is made 613. When the horizontal direction indicates a left swipe, the display 118 increments 615 the list through interaction with the webpage. When the horizontal direction indicates a right swipe, the display 118 decrements 617 the list through interaction with the webpage. Alternatively, a left swipe may be associated with decrementing and a right swipe with incrementing. The incrementing 615 and decrementing 617 processes may optionally include determining a length of the swipe and displaying a part of the list based on the length of the swipe.

Advancing or decrementing information in response to a gesture in a different direction than one utilized for scrolling is shown in the examples of FIG. 2 through FIG. 5, and the flowchart of FIG. 6. The flowchart of FIG. 7 and the examples of FIG. 8 through FIG. 11 illustrate advancing or decrementing information in response to gesture such as a double swipe. Thus, advancing or decrementing information is accomplished with a different gesture than the gesture utilized for scrolling. Incrementing and decrementing information generally includes skipping or jumping from displaying a first part of the information to displaying a second part of the information without displaying or scrolling through all of the information between the first and the second part. For example, incrementing or decrementing includes jumping to another page in a list, such as described above, moving to a different part of the information, such as the bottom of a webpage, edge of a photo, or another part of a category of information, such as another date, author, or subject for emails. By skipping the display of at least some of the information, less time and energy is spent retrieving and displaying the skipped information. Similarly, scrolling through the list using groupings, less time and energy is spent retrieving and displaying the grouped information.

Figure 7:
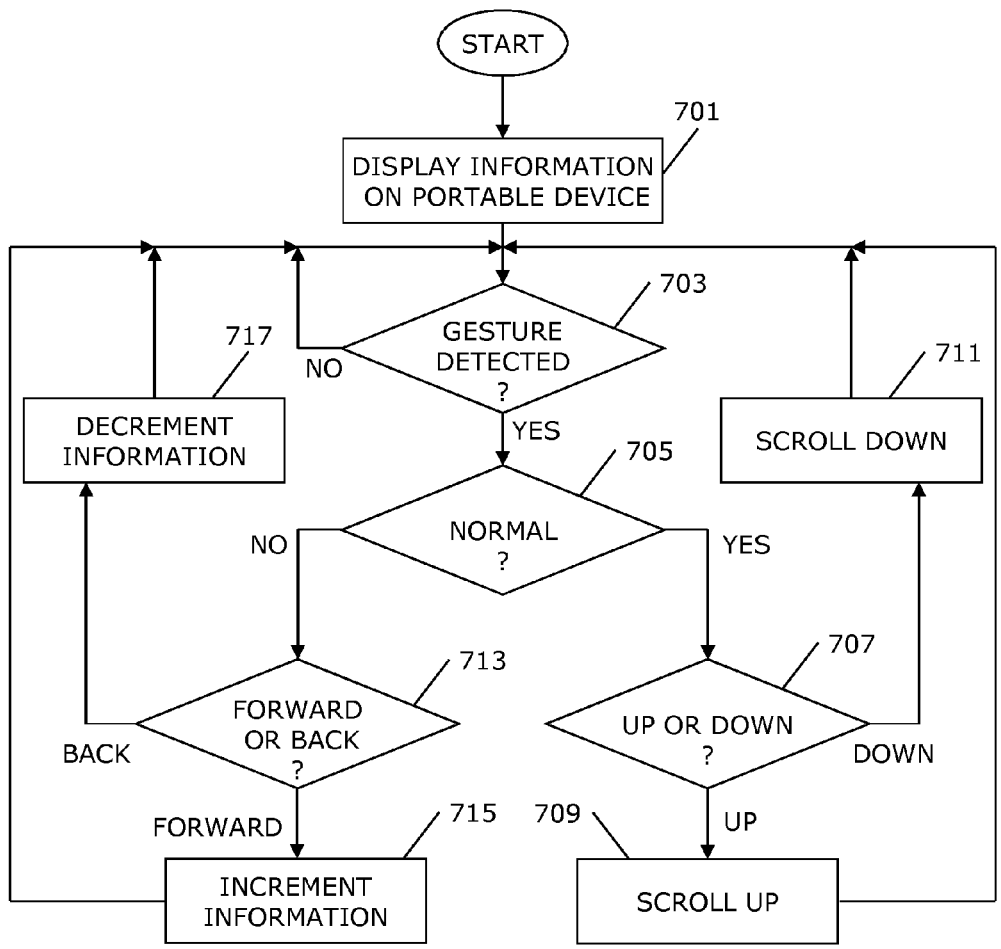
FIG. 7 is a flowchart illustrating a method of displaying information based on a detected gesture in accordance with the present disclosure.

A flowchart illustrating a method of displaying information based on a detected gesture is shown in FIG. 7. As with FIG. 6, the method may be carried out by software executed by, for example, the processor 102. Coding of software for carrying out such a method is within the scope of a person of ordinary skill in the art given the present description.

Information is displayed 701 on the touch-sensitive display 118 of the portable electronic device 100. In the example shown, a large amount of information is generally navigated. When a gesture is detected 703, the gesture is analyzed 705 to determine whether the gesture is part of a normal or default mode in which scrolling takes place. For example, a vertical gesture, either up or down, may be considered normal, to indicate scrolling up or down within the information. Other types of gestures or directions of gestures may be considered to be the normal or default mode. For a normal gesture, when the direction or other characteristic of the gesture indicates 707 to scroll up, the display 118 scrolls 709 upward within the information. For a normal gesture, when the direction or other characteristic of the gesture indicates 707 to scroll down, the display 118 scrolls 709 downward within the information.

An alternative gesture, i.e., one that is different from a normal or default gesture, places the device 100 in an alternate mode of operation, which in this example increments or decrements the information. An alternate gesture may have any of number of different attributes from a normal gesture. For example, as described above, the alternate gesture may take place in a different direction, such as a horizontal swipe when a normal gesture is in a vertical direction. The alternate gesture may be separated by, for example, 45 degrees, 90 degrees, or another easily reproduced angle from a normal gesture. Alternatively, the alternate gesture may be a multiple swipe, such as a double swipe, triple swipe, or other multiple swipe. An alternate gesture may alternatively be a combination touch event, such as a swipe and touch, a swipe or multiple swipe simultaneously in combination with one or more non-moving touches, and so forth. The multiple swipe or combination touch event need not be in a different direction than a normal gesture, although the direction may be in a different direction. A multiple swipe or combination touch event in the same direction of the normal gesture may advantageously utilize the same convention as utilized for scrolling up and down, e.g., a double swipe in the same direction as a swipe to scroll up increments information or a double swipe in the same direction as a swipe to scroll down decrements information. The alternate gesture may comprise other different attributes than those described herein.

When the alternate gesture is associated 713 with navigating forward in the information, the display 118 increments 715 the information. When the alternate gesture is associated 713 with navigating backward in the information, the display 118 decrements 717 the information. Different associations of navigating through information with direction of the gesture may be utilized than those described herein. The incrementing 715 and decrementing 717 processes may optionally include determining a length of the gesture and displaying a part of the information based on the length of the gesture, as described above.

Figure 8:
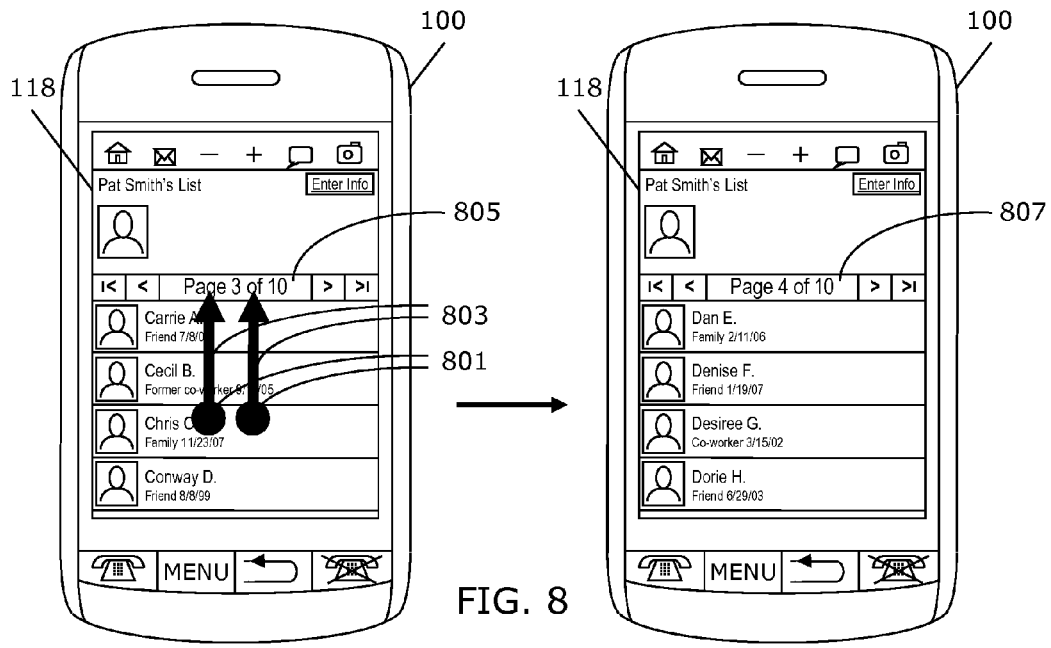
FIG. 8 and FIG. 10 illustrate examples of a display before and after advancing information in the form of emails in response to an alternate gesture in accordance with the present disclosure.
Figure 9:
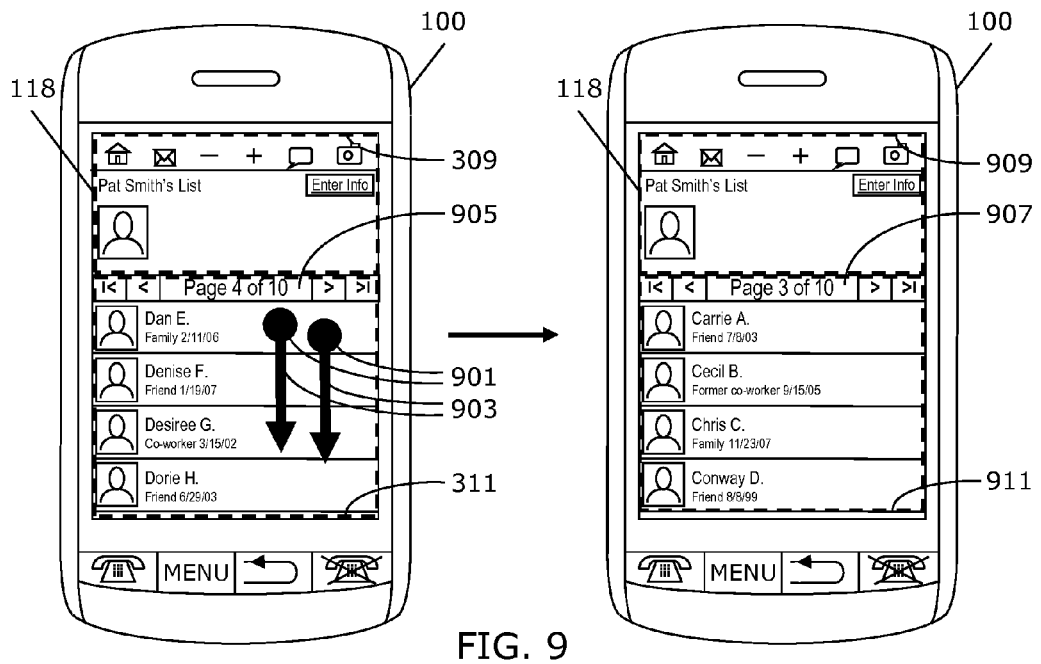
FIG. 9 and FIG. 11 illustrate examples of a display before and after decrementing information in the form of emails in response to an alternate gesture in accordance with the present disclosure.
Figure 10:
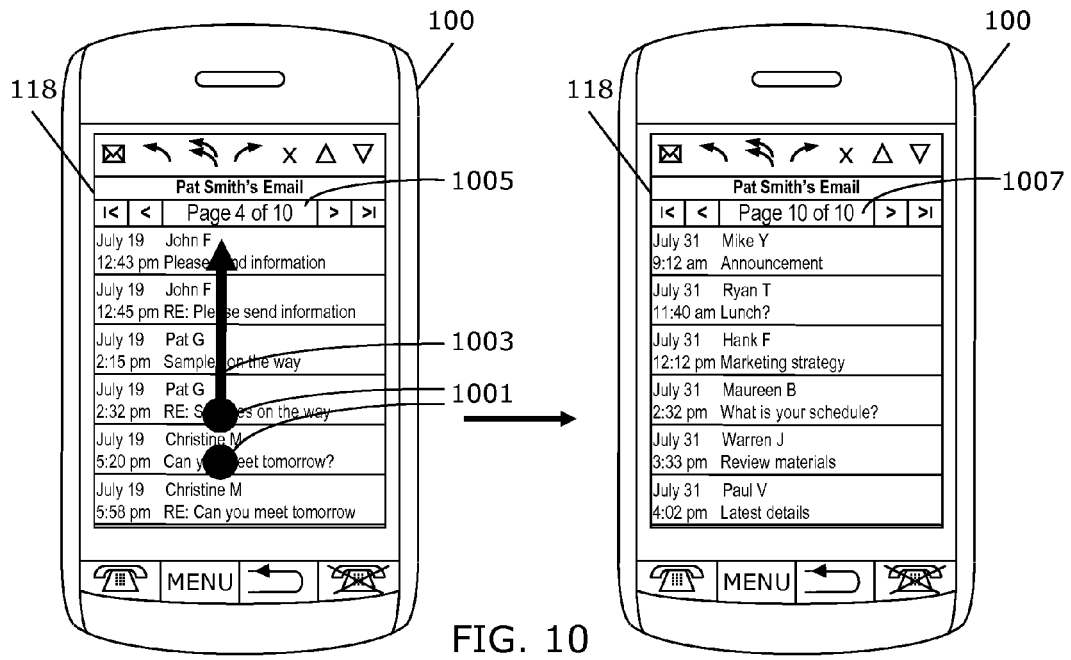

An example of a display before and after advancing or incrementing information in response to an alternate gesture is shown in FIG. 8, and an example of a display before and after decrementing information is shown in FIG. 9. In this example, contacts from a social-networking website are presented to a user. The left-hand device 100 of FIG. 8 shows a window 805 that indicates Page 3 of 10 of the contacts. The origin points 801 of the gesture, which in this example is a double swipe, 803 are shown with respect to the touch-sensitive display 118, and the direction of the gesture is indicated by the upward arrows. When this gesture is detected, the touch-sensitive display 118 advances the page displayed, and as shown in the right-hand device 100 of FIG. 8, Page 4 of 10 is indicated in the window 807.

Similarly, the page may be decremented as shown in FIG. 9. The left-hand device 100 of FIG. 9 shows a window 905 that indicates Page 4 of 10 of the contacts. The origin points 901 of the gesture, e.g., a double swipe, 903 are shown with respect to the touch-sensitive display 118. Each of the origin points 901 are shown slightly displaced in the vertical direction, for example, when an index and middle finger make a double swipe by either a left hand pointing upward or a right hand pointing to the left. When this swipe 903 is detected, the touch-sensitive display 118 decrements the page displayed, and as shown in the right-hand device 100 of FIG. 3, Page 3 of 10 is indicated in the window 307. In these examples, the double swipe takes place in one of two vertical directions, and which vertical direction determines whether a part of the information that occurs earlier or later is displayed.

Optionally, as described above with respect to FIG. 3, a first part 309 of the display 118 may display common or the same information related to the application no matter which part of the information is displayed, and a second part 311 of the display 118 may display the various parts of the information. In other words, the part of the information being displayed changes in the second part of the display 311 while the contents of the rest of the screen 118 are preserved in the first part 309.

As described above, a long swipe may be utilized to jump to the beginning or end of information. In the example shown in FIG. 10 for information comprising emails, the origin points 1001 of the combination gesture 1003 are shown with respect to the touch-sensitive display 118, and the direction of the gesture is upward along the screen 118. The combination gesture 1003 shown comprises a relatively static touch below an upward swipe. The information is shown as emails categorized by date. The information may alternatively be categorized in other ways, such as by the name of the email sender, the subject of the email, and so forth. Other categories may be utilized for other types of information, such as nature of a contact person (e.g., friend, co-worker and so forth) or price of an auction. In this example, the long gesture 1003 is interpreted as displaying one end, e.g., the first or last part of the information. When this long combination gesture 1003 is detected, the touch-sensitive display 118 advances the page displayed to the last page, and as shown in the right-hand device 100 of FIG. 10, Page 10 of 10 is indicated in the window 1007.

Figure 11:
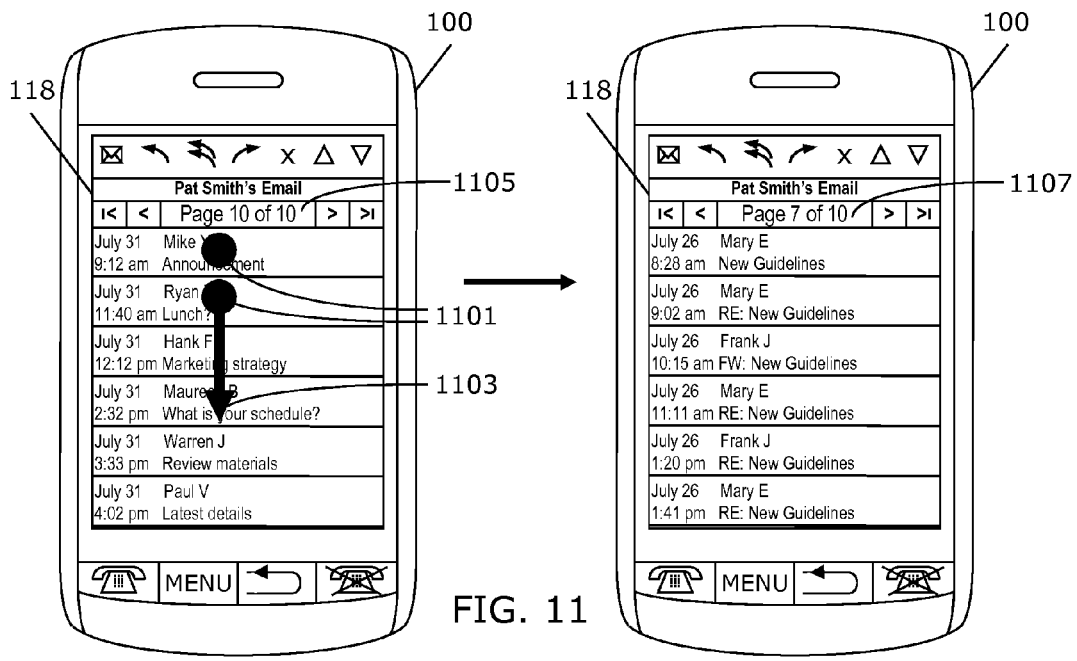

In the example shown in FIG. 11, the origin points 1101 of the a medium combination gesture 1103 are shown with respect to the touch-sensitive display 118, and the direction of the gesture 1103 is downward along the screen 118. The left-hand device 100 of FIG. 11 shows a window 1105 that indicates Page 10 of 10 of the information comprising emails. In this example, the medium gesture 1103 is interpreted as incrementing/decrementing by 3 parts or pages of information. When this medium gesture 1103 is detected, the touch-sensitive display 118 decrements the page displayed by 3 pages, and as shown in the right-hand device 100 of FIG. 11, Page 7 of 10 is indicated in the window 1107.

Although the gestures 203, 303, 403, 503, 803, 903, 1003, 1103 are shown starting at one side of the screen, the gestures 203, 303, 403, 503, 803, 903, 1003, 1103 may originate anywhere on the screen 118, provided sufficient room is present on the screen 118 to detect the gesture 203, 303, 403, 503, 803, 903, 1003, 1103 and/or the length of the gesture.

A method comprises displaying, on a touch-sensitive display of a portable electronic device, information having a first part and a second part. A first gesture is detected, by the touch-sensitive display, in a first direction on the touch-sensitive display, and scrolling within the information occurs in response to the first gesture. A second gesture that is different from the first gesture is detected, by the touch-sensitive display. A second part of the information is displayed on the touch-sensitive display in response to the second gesture.

Alternatively, the method comprises displaying information on a touch-sensitive display of a portable electronic device, wherein the information comprises at least a first part and a second part, and detecting, by the touch-sensitive display, a first gesture in a first direction on the touch-sensitive display, and scrolling within the first part of the information displayed on the touch-sensitive display in response to the first gesture. A second gesture that is different from the first gesture is detected by the touch-sensitive display, and the second part of the information is displayed on the touch-sensitive display in response to the second gesture.

A portable electronic device comprises a touch-sensitive display, configured to display information having a first part and a second part and to receive a gesture by a user, and a microprocessor configured to detect, on the touch-sensitive display, a first gesture in a first direction and to scroll within a first part of the information in response to the first gesture and detect, on the touch-sensitive display, a second gesture that is different from the first gesture and to display the second part of the information on the touch-sensitive display in response to the second gesture.

The second gesture may be different from the first gesture in that the first gesture is in a substantially vertical direction and the second gesture is in a substantially horizontal direction. The second gesture may be different from the first gesture in that the first gesture comprises a single swipe and the second gesture comprises one of a double swipe and a combination swipe. The second part of the list may occur later in the list than the first part of the list. The second part of the list may occur earlier in the list than the first part of the list. The information may comprise a list, and wherein the second part of the information may differ from the first part of the information by a category by which the list is sorted. The category may be one of a date, a name, and a subject. The first direction may be referenced with respect to the touch-sensitive display. The first direction may be referenced with respect to orientation of the information. A length of the second gesture may be determined and a part of the information may be displayed based on the length of the second gesture. The information may be displayed in one area of the touch-sensitive display while preserving other information in a second area of the touch-sensitive display. A computer readable medium may have stored instructions for execution by a processor of a mobile device and for causing the mobile device to implement the method. The second gesture may change the information displayed no matter what part of the information is displayed at the time of the second gesture. The information may comprise a list output by a software application.

A method comprises, during a first mode of operation of a touch-sensitive display, detecting a first gesture and scrolling, by the touch-sensitive display, through information in response to the first gesture; and during a second mode of operation of a touch-sensitive display, detecting a second gesture and jumping, by the touch-sensitive display, to a different part of the information in response to the second gesture. The first mode may be entered when a first-mode gesture having a first attribute is detected, and wherein the second mode may be entered when a second-mode gesture having a second attribute is detected. The first attribute may comprise a direction of the first-mode gesture. The second attribute may comprise a direction of the second-mode gesture, which direction is relatively perpendicular to a direction of the first-mode gesture. The second attribute may comprise a plurality of touch aspects.

The present disclosure provides an advantageous way of displaying a large amount of information, such as a list, on a portable electronic device, which method is faster than prior methods. A detected gesture, such as a swipe, is utilized to move forward or go back within the information. A shorter or quicker gesture advances or goes back a short amount in the information, whereas a longer or faster gesture advances a larger distance in the information. The gesture may take place no matter what part of the information is displayed at the time of the gesture. The use of a gesture obviates the need to find and press a button on a specific part of an application, to enter a menu and select an option, or to use any other more time-consuming method to jump through the information. A faster process to display different parts of the information results for numerous applications, including, but not limited to, web browsers, contact lists, emails, music, photos, auctions, and data, to name a few.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   displaying, on a touch-sensitive display of a portable electronic device, information having a first part, a second part, and a third part located between the first part and the second part, wherein the first part, the second part, and the third part are scrollable with each other;
   while the first part of the information is displayed, detecting, by the touch-sensitive display, a first gesture in a first direction on the touch-sensitive display, and scrolling within the information in response to the first gesture;
   while the first part of the information is displayed and the second part of the information is not displayed, detecting, by the touch-sensitive display, a second gesture that is different from the first gesture, and displaying a second part of the information on the touch-sensitive display in response to the second gesture, wherein the second part of the information is displayed without scrolling through the third part of the information.

2. The method of claim 1, wherein the second gesture is different from the first gesture in that the first gesture is in a substantially vertical direction and the second gesture is in a substantially horizontal direction.

3. The method of claim 1, wherein the second gesture is different from the first gesture in that the first gesture comprises a single swipe and the second gesture comprises one of a multiple swipe and a combination swipe.

4. The method of claim 1, wherein the second part of the information occurs later in the information than the first part of the information.

5. The method of claim 1, wherein the second part of the information occurs earlier in the information than the first part of the information.

6. The method of claim 1, wherein the information comprises a list, and wherein the second part of the information differs from the first part of the information by a category by which the list is sorted.

7. The method of claim 6, wherein the category is one of a date, a name, and a subject.

8. The method of claim 1, wherein the information comprises a document.

9. The method of claim 1, wherein the information comprises search results.

10. The method of claim 1, further comprising determining a length of the second gesture and displaying a part of the information based on the length of the second gesture.

11. The method of claim 1, further comprising displaying the information in one area of the touch-sensitive display while preserving other information in a second area of the touch-sensitive display.

12. A computer readable storage device having computer-readable code executable by at least one processor of the portable electronic device to perform the method of claim 1.

13. A portable electronic device comprising:
a touch-sensitive display configured to display information having a first part, a second part, and a third part located between the first part and the second part and to receive a gesture;
a processor configured to, while the first part of the information is displayed:
detect, on the touch-sensitive display, a first gesture in a first direction and to scroll within a first part of the information and the third part of the information in response to the first gesture and
while the second part of the information is not displayed, detect, on the touch-sensitive display, a second gesture that is different from the first gesture and to display the second part of the information on the touch-sensitive display in response to the second gesture, wherein the second part of the information is displayed without scrolling through the third part of the information.

14. The portable electronic device of claim 13, wherein the second gesture is different from the first gesture in that the first gesture comprises a single swipe and the second gesture comprises one of a multiple swipe and a combination swipe.

15. The portable electronic device of claim 13, wherein the second gesture is different from the first gesture in that the first gesture is in a substantially vertical direction and the second gesture is in a substantially horizontal direction.

16. The portable electronic device of claim 13, wherein the processor is further configured to determine a length of the second gesture and display a part of the information based on the length of the second gesture.

17. The portable electronic device of claim 13, wherein the information comprises a list, and wherein the second part of the information differs from the first part of the information by a category by which the list is sorted.

18. A method comprising:
displaying information on a touch-sensitive display of a portable electronic device, wherein the information comprises at least a first part, a second part, and a third part located between the first part and the second part, and wherein the first part, the second part, and the third part are scrollable with each other;
while the first part of the information is displayed, detecting, by the touch-sensitive display, a first gesture in a first direction on the touch-sensitive display, and scrolling within the first part and the third part of the information in response to the first gesture;
while the first part of the information is displayed and the second part of the information is not displayed, detecting, by the touch-sensitive display, a second gesture that is different from the first gesture, and displaying the second part of the information on the touch-sensitive display in response to the second gesture, wherein the second part of the information is displayed without scrolling through the third part of the information.

19. The method of claim 18, wherein the second part of the information occurs later in the information than the first part of the information.

20. The method of claim 18, further comprising determining a length of the second gesture and displaying a part of the information based on the length of the second gesture.

21. The method of claim 18, wherein the second part of the information occurs earlier in the information than the first part of the information.

22. The method of claim 18, wherein the second gesture is different from the first gesture in that the first gesture is in a substantially vertical direction and the second gesture is in a substantially horizontal direction.

23. The method of claim 18, wherein second gesture is different from the first gesture in that the first gesture comprises a single swipe and the second gesture comprises one of a multiple swipe and a combination swipe.

24. The method of claim 18, wherein the information comprises a list, and wherein the second part of the information differs from the first part of the information by a category by which the list is sorted.

25. A computer readable storage device having computer-readable code executable by at least one processor of the portable electronic device to perform the method of claim 18.

26. A method comprising:
during a first mode of operation of a touch-sensitive display, detecting a first gesture and scrolling, by the touch-sensitive display, through information in response to the first gesture;
during a second mode of operation of a touch-sensitive display, while displaying one part of the information and not displaying a different part of the information, detecting a second gesture and jumping, by the touch-sensitive display, to display the different part of the information in response to the second gesture without scrolling through intermediary information located between the one part and the different part, wherein the one part, the different part, and the intermediary information are scrollable with each other.

27. The method of claim 26, wherein the first mode is entered when a first-mode gesture having a first attribute is detected, and wherein the second mode is entered when a second-mode gesture having a second attribute is detected.

28. The method of claim 27, wherein the first attribute comprises a direction of the first-mode gesture.

29. The method of claim 27, wherein the information comprises one of a list, a document, and search results.

30. The method of claim 27, wherein the second attribute comprises a plurality of touch aspects.

31. A method comprising:
- displaying, on a touch-sensitive display of a portable electronic device, information having a first part, a second part, and a third part located between the first part and the second part;
- while the first part of the information is displayed, detecting, by the touch-sensitive display, a first gesture in a first direction on the touch-sensitive display, and scrolling within the first part and the third part of the information in response to the first gesture;
- while the first part of the information is displayed and the second part of the information is not displayed, detecting, by the touch-sensitive display, a second gesture that is different from the first gesture, and displaying a second part of the information on the touch-sensitive display in response to the second gesture, wherein the second part of the information is displayed without scrolling through the third part of the information.

* * * * *